United States Patent
Hausman et al.

(10) Patent No.: US 7,588,206 B2
(45) Date of Patent: *Sep. 15, 2009

(54) MATERIAL PROCESSING APPARATUS AND METHODS

(75) Inventors: J. Mark Hausman, Medina, OH (US); Richard B. Turner, Lake Worth, FL (US)

(73) Assignee: Armex, Inc., Akron, OH (US)

( * ) Notice: Subject to any disclaimer, the term of this patent is extended or adjusted under 35 U.S.C. 154(b) by 43 days.

This patent is subject to a terminal disclaimer.

(21) Appl. No.: 11/011,559

(22) Filed: Dec. 14, 2004

(65) Prior Publication Data
US 2005/0205701 A1     Sep. 22, 2005

Related U.S. Application Data

(60) Provisional application No. 60/533,490, filed on Dec. 31, 2003.

(51) Int. Cl.
*B02C 7/04* (2006.01)
*B02C 13/20* (2006.01)

(52) U.S. Cl. ............... 241/235; 241/101.2; 241/159

(58) Field of Classification Search ........... 241/157, 241/236, 243, 235, 101.2, 159
See application file for complete search history.

(56) References Cited

U.S. PATENT DOCUMENTS

| 3,396,914 | A | * | 8/1968 | Liebman | 241/63 |
|---|---|---|---|---|---|
| 3,861,601 | A | * | 1/1975 | Kaelin | 241/31 |
| 3,931,935 | A | * | 1/1976 | Holman | 241/24.1 |
| 3,964,718 | A | * | 6/1976 | Balistrieri | 241/79 |
| 3,991,944 | A | * | 11/1976 | Baikoff | 241/36 |
| 4,342,647 | A | | 8/1982 | McMillian et al. | |
| 4,726,530 | A | * | 2/1988 | Miller et al. | 241/19 |
| 5,192,028 | A | * | 3/1993 | Curran | 241/3 |
| 5,285,973 | A | * | 2/1994 | Goforth et al. | 241/36 |
| 5,411,213 | A | * | 5/1995 | Just | 241/16 |
| 5,411,216 | A | | 5/1995 | O'Keefe | |
| 5,511,729 | A | | 4/1996 | Husain | |
| 5,547,133 | A | * | 8/1996 | Rogers et al. | 241/9 |
| 5,904,305 | A | | 5/1999 | Kaczmarek | |
| 5,927,627 | A | * | 7/1999 | Edson et al. | 241/159 |
| 6,047,911 | A | * | 4/2000 | Yap | 241/23 |
| 6,052,978 | A | * | 4/2000 | Kempf | 56/119 |
| 6,098,905 | A | * | 8/2000 | Salem et al. | 241/3 |
| 6,357,683 | B1 | * | 3/2002 | Patzelt et al. | 241/235 |

(Continued)

OTHER PUBLICATIONS

Scrap Tire News Online, "Crumb Rubber Markets, North America," www.scraptirenews.com, Recycling Research Institute, p. 2, (1999).

(Continued)

*Primary Examiner*—Bena Miller
(74) *Attorney, Agent, or Firm*—Hahn Loeser + Parks LLP; Scott M. Oldham (57) ABSTRACT

The present invention relates to a material processing apparatus. The apparatus includes a frame including a pair of laterally opposed parallel sides and a base, and at least a first pair of substantially cylindrical material processing rolling assemblies, wherein each pair of rolling assemblies are driven by a hydraulic drive motor assembly, such that using the hydraulic drive motors, the rolling assemblies can be driven at a variable friction ratio.

18 Claims, 4 Drawing Sheets

U.S. PATENT DOCUMENTS 6,523,763 B1 * 2/2003 Mizoguchi .................... 241/3
6,590,042 B1    7/2003 Tang
6,815,510 B2   11/2004 Rouse et al.

OTHER PUBLICATIONS

Scrap Tire News Online, "Ambient Process," www.scraptirenews.com, Recycling Research Institute, p. 2, (1999).

* cited by examiner

MATERIAL PROCESSING APPARATUS AND METHODS

This application claims the benefit of U.S. Provisional Patent Application Ser. No. 60/533,490, filed Dec. 31, 2003, herein incorporated by reference.

TECHNICAL FIELD

This invention relates to systems and methods for the size reduction of materials. More particularly, this invention relates to systems and methods for the size reduction of elastomeric materials by tearing and grinding the materials between rotating milling rollers.

BACKGROUND OF THE INVENTION

Scrap tires are generated at a rate of 270 million per year in the United States. They are non-biodegradable having been originally designed to last, when placed on a motorized vehicle, for tens of thousands of road miles. They are comprised of rubber, approximately 70% by weight, steel, approximately 20% by weight, and reinforcing textile fibers.

The disposal or reuse of previously used rubber products, such as rubber tires, presents many problems. Ecologically, rubber tires degrade very slowly and if disposed of improperly, may lead to hazardous environmental conditions in terms of both potential ground water problems and other ecological effects. The standard practice to remove these scrap tires from the solid waste stream has been to first run the tire through a tire shredder. Once shredded, the tire shreds can be returned to the solid waste stream, burned as tire derived fuel (TDF) or used as a feedstock for further processing into small, mesh size crumb rubber.

Recently, recycling of pre-used rubber products has increased in popularity in order to avoid potential negative environmental impact as well as to provide potentially commercially reusable rubber products.

Several methods for recycling used rubber products exist. Often, rubber products such as rubber tires are rendered into fine particulate rubber which then may be reused in other rubber products or other uses. However, one of the difficulties with recycling rubber products such as tires is that such products are extremely durable and consequently difficult to reduce to a re-usable form. In order for any recycling effort to be cost effective, a method must be developed to reduce the extremely durable rubber products to a form of rubber that may be useable in further generating processes. Recycled rubber particles become more commercially valuable with decreasing particle size. The commercial value increases because rubber particles of smaller sizes may be more easily incorporated into a wider variety of new rubber products or other applications.

Rubber recycling reclamation or granulating machines may be classified into two types. A first type produces fairly large rubber particles and operates at room temperature, relating to a shredder often using rotating knives to produce the particles. Although the process is fairly inexpensive, the large rubber particles produced, while usable for applications such as ground cover, are not generally usable for more commercially desirable applications such as new rubber products. A second type of rubber reclamation is cryogenic grinding methods where the machinery operates at extremely low temperatures using liquid nitrogen. Because the process requires continual replenishment of liquid nitrogen for maintaining operation at low temperatures, the process is fairly expensive.

Current two roll mill systems are used for a variety of purposes, including blending and mixing of elastomeric materials. Certain two roll mill designs have been used for reducing the particle size of materials. Two roll mills as previously designed have various drawbacks, such as the rolls are difficult to insert and remove for maintenance. This results in relatively long periods of down time, and subtracts from the productivity of the system in processing material. Another disadvantage with presently-known two roll mill systems is that the rolls are driven by electro-mechanical drives which must be designed to accommodate high shock loads, as encountered in rubber processing, for example. The high shock loads can ultimately lead to stalling of the shredder. Furthermore, unsealed bronze sleeve bearings typically used in two roll mill systems need to be water-cooled, and while handling high pressures and temperatures during size reduction, can be contaminated by the rubber particles entering the bearing. Current two roll mill systems also operate at a fixed friction ratio, and generally have no speed differential between the two rolls or, if any, only a ratio of up to 3:1 is obtained by gear reduction.

Accordingly, there is a need for a materials processing system that avoids the deficiencies of the prior art machines and methods, to provide a cost-effective and efficient processing system. Further, there is a need for an improved two roll mill system which overcomes the problems of previous mill designs for processing of materials, particularly elastomeric materials, having a fully variable friction ratio and sealed bearings capable of withstanding higher pressures and temperatures than current two roll mill systems.

SUMMARY OF THE INVENTION

The present invention relates to a material processing apparatus and method. The apparatus includes a frame having a pair of laterally opposed parallel sides and a base, and at least a first pair of substantially cylindrical material processing rolling assemblies, wherein each pair of rolling assemblies are counter-rotating assemblies, forming a nip therebetween through which material is processed. Each of the rolls is driven with a hydraulic drive motor assembly, such that the apparatus is capable of obtaining a greater variable friction ratio, up to 60:1, between the rolls.

In accordance with another aspect of the present invention, a material processing apparatus is provided. The apparatus includes a frame supporting at least a first pair and at least a second pair of material processing rolling assemblies, wherein each pair of rolling assemblies comprise corrugated counter-rotating rolls, each roll being driven by a drive motor assembly to enable a speed differential to be obtained between the rolls.

In accordance with another aspect of the present invention, a method of reducing the particle size of a material is provided. The method includes feeding a material into a material processing apparatus, the material processing apparatus comprising a frame supporting at least a first pair of rolls rotatably driven in counter-rotating relationship at a variable differential speed relative to one another, processing the material through the at least first pair of rolls, and conveying the material away from the material processing apparatus.

These and other advantages and novel features of the present invention, as well as details of an illustrated embodiment thereof, will be more fully understood from the following description and drawings.

DETAILED DESCRIPTION OF THE INVENTION

Figure 1:
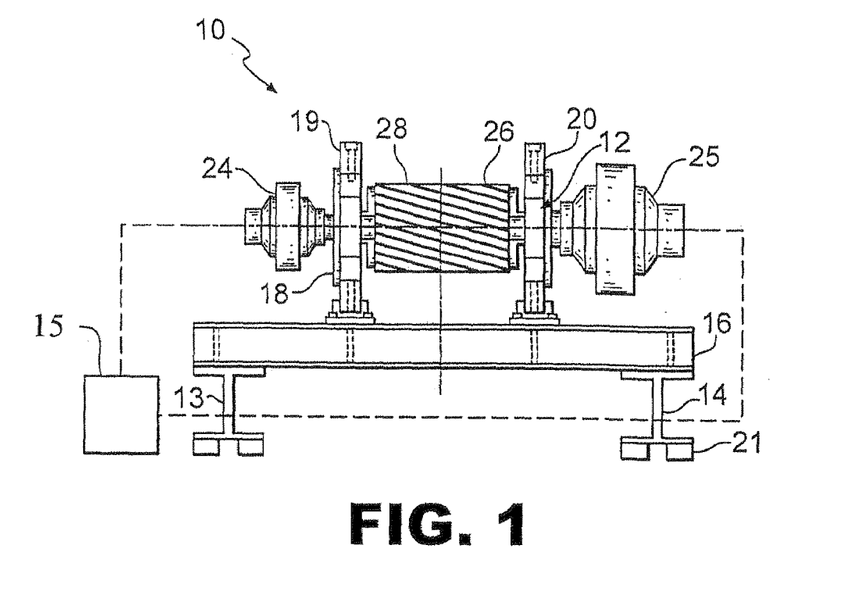
FIG. 1 is a side elevational view in partial section of a first embodiment of the material processing apparatus of the present invention.
Figure 2:
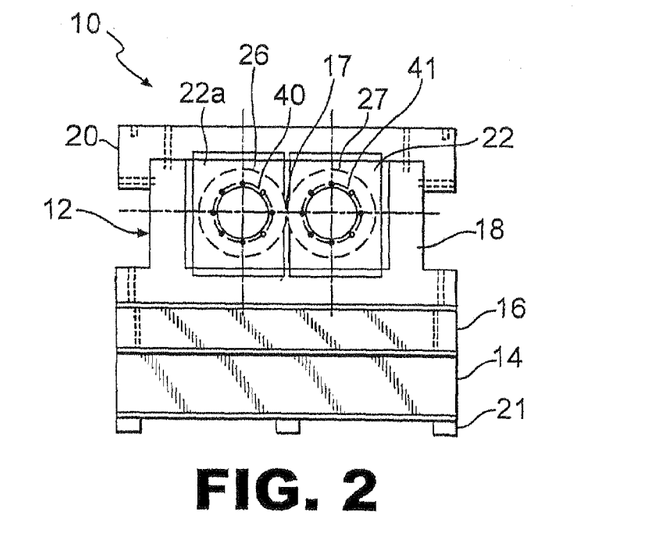
FIG. 2 is another side elevational view of FIG. 1 in partial section of the material processing apparatus of the present invention.

As shown in FIGS. 1 and 2, a first embodiment of the present invention is shown. The material processing apparatus of the present invention, generally designated 10, includes a support frame 12, which may be constructed modularly using separate members including a pair of support legs 13 and 14 on which a base 16 is supported. Side support members 15 may include sidewall portions 18 and cap portions 20. Anti-vibrational mounts 21 may be added to the bottom portion of support legs 14 for noise reduction purposes. Sidewall portions 18 and cap portions 20 support end bearing housings 22 and 22a, which comprise sealed, tapered rolling bearings for support of the drive shaft at each material processing rolling assembly 26 and 27.

Figure 3:
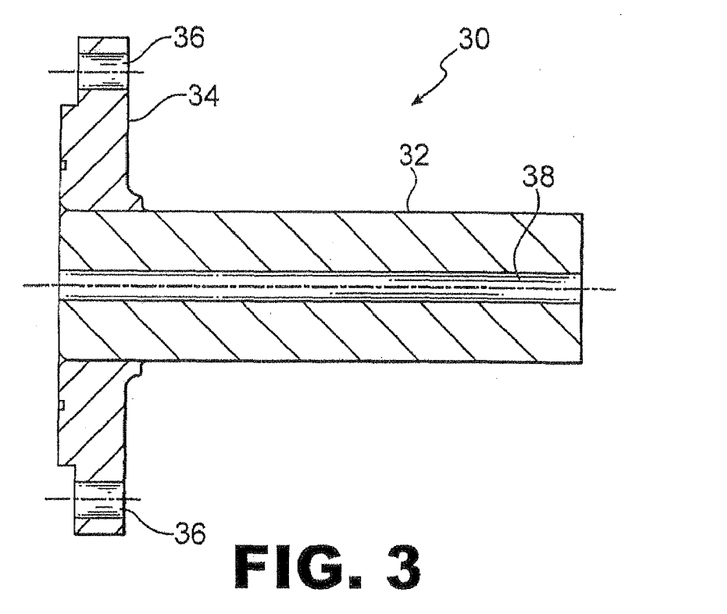
FIG. 3 is a cross-sectional view of the bearing shaft assembly of the present invention.

A pair of drive motor assemblies 24 and 25 are provided for rotatably driving the rolls 26 and 27 in a desired manner. Each drive motor assembly 24 and 25 includes an output shaft which is in turn drivingly coupled to a roll mount assembly 30, as seen in FIG. 3. The drive motors 24 and 25 are preferably hydraulic drive motors that can drive each roll 26 and 27 at a variable speed. As seen in FIGS. 1 and 2, the rolls 26 and 27 are positioned adjacent one another to form a nip 17 between the rolls 26 and 27. This area provides compression and shearing of material in the nip 17, which along with corrugations 28 formed in rolls 26 and 27, provide the forces on material to tear and shred material processed therethrough. The material processing apparatus 10 of the present invention utilizes tapered roller bearings to support rolls 26 and 27. These bearings are capable of withstanding higher pressures and temperatures than the standard bronze sleeve bearings currently used in standard milling systems. The tapered roller bearings are sealed, therefore there is no requirement for water to cool these bearings, and grease spills are no longer a problem. Further, the possibility of contamination from small particles of material being processed is no longer a concern. With the use of hydraulic motors, the need for gear reducers is eliminated. The hydraulic motors are also capable of handling high shock loads and provide the added benefit of increasing the torque value for each roll while virtually eliminating roll stoppage or stalling during the particle size reduction process.

A closed-loop hydrostatic power unit (HPU) 15 (shown in FIG. 1) powers the hydraulic motors 24 and 25. This HPU 15 allows for a fully variable speed to be obtained for each roll 26 and 27 thereby providing a variable friction ratio, which is the differential between roll speeds. The hydraulic drives 24 and 25 run much quieter than standard electro-mechanical drives currently found on conventional two roll processing mills. Further, conventional two roll processing mills have a fixed friction ratio. The apparatus of the present invention is capable of obtaining a variable friction ratio of up to 60:1. This allows the apparatus of the present invention to quickly and efficiently to reduce the particle size of hard, vulcanized rubber found in scrap tires, for example.

Figure 4:
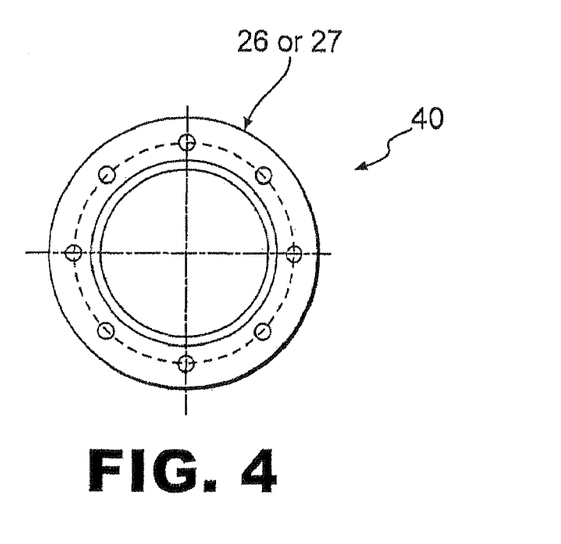
FIG. 4 is a side view of the end cap of the material roller processing assembly of the present invention.
Figure 5:
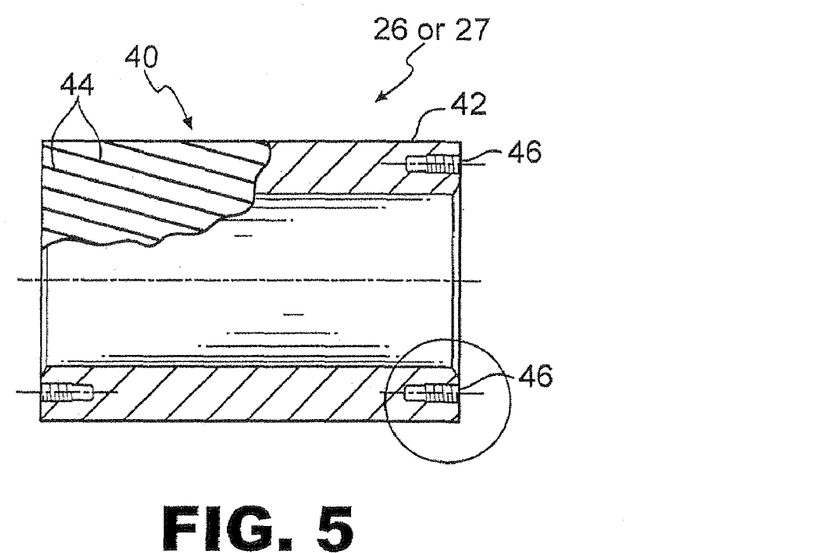
FIG. 5 is a cross-sectional view of the material roller processing assembly of the present invention.

The pair of substantially cylindrical, material processing roller assemblies 26 and 27 mounted within support frames 12 are shown in more detail in FIGS. 3-5. The rolls 26 and 27 may be constructed to facilitate operation of apparatus 10, by allowing rolls 26 and 27 to be easily removed and replaced. The rolls 26 and 27 may be constructed of a pair of end plate assemblies 30, as shown in FIG. 3. The end plate assemblies 30 comprise a shaft 32, which on one side is selectively coupled to and driven by a drive motor for imparting rotational motion to assembly 30 and the roll 26 or 27 with which it is used. The shaft 32 is also supported for rotational motion in bearings as previously described. The assemblies 30 also have end plate member 34, which includes a number of mounting holes 36 formed therein. The shafts 32 may be a channel 38 formed therein, to allow a cooling fluid to be circulated through roll 26 or 27. The assemblies 30 further comprise a main body portion 40, having a working surface 42 formed on its exterior, the working surface 42 preferably having corrugations 44 formed thereon. The roll body 40 may be hollow to allow a cooling fluid to be circulated therethrough to control temperature of the working surface 42. The edges of roll body 40 may be provided with journalled mounting holes 46 for mounting of end plate assemblies 30, using bolts or other suitable fasteners. Based upon the construction of assemblies 30, it should be recognized that the main body 40 may be easily removed by simply unfastening it from end plates 30. In this manner, the roll body 40 may be removed and replaced quickly, for maintenance or the like.

Each of the roll bodies 40 of the present invention may be made of a high carbon steel alloy that does not crack and allows for a roll hardness of 60 Rc. Currently, only one-piece conventional chilled cast iron rolls are used for milling systems. These cast iron rolls have a propensity to crack and can only achieve 50-55 Rc.

Figure 6:
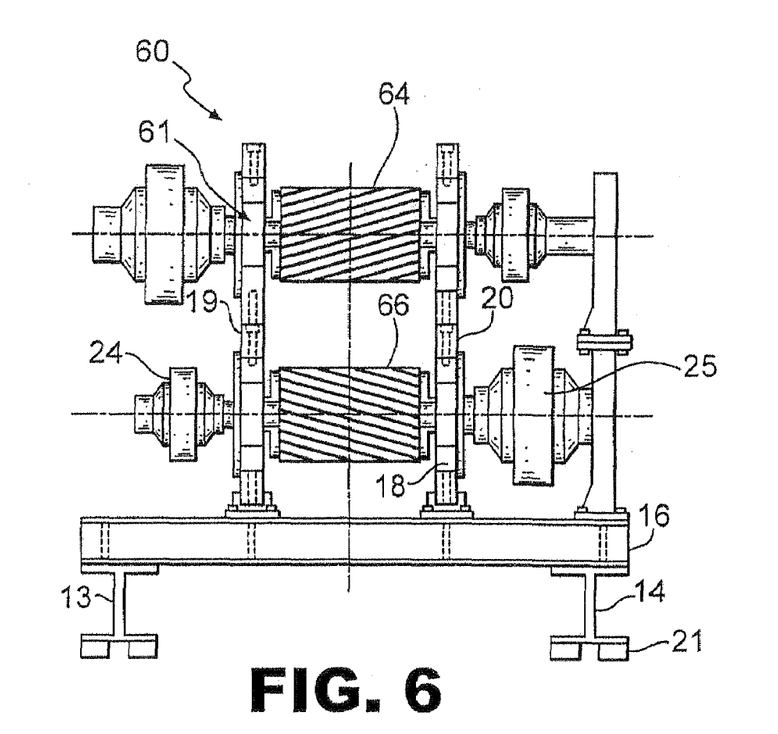
FIG. 6 is a side elevational view in partial section of a second embodiment of the present invention.
Figure 7:
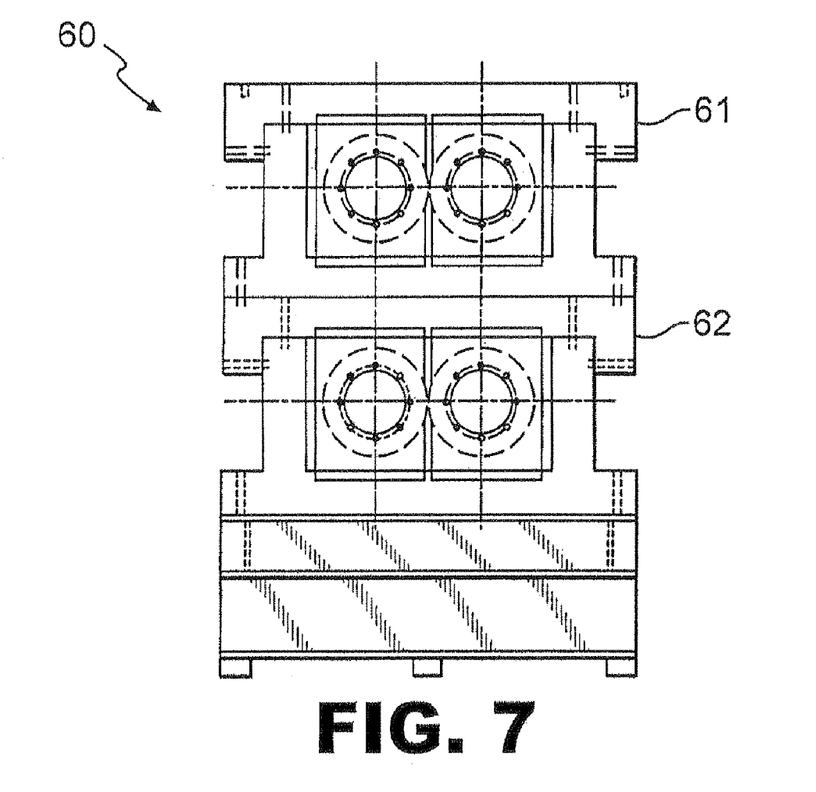
FIG. 7 is another side elevational view of FIG. 6 in partial section of a second embodiment of the material processing apparatus of the present invention.

In another embodiment of the present invention, as seen in FIGS. 6 and 7, a system generally indicated at 60 includes first and second support frames 61 and 62, such as similar to that previously described. In this embodiment, the frames 61 and 62 are stackable, such that the pairs of material processing rolling assemblies 64 and 66 of each are stacked relative to each other. Although two machines are shown in the stacked configuration, additional machines may also be stacked if desired. Support frames 61 and 62 are configured to allow stacking and connection of frames 61 and 62 to one another.

In use, a feedstock, such as an elastomeric material is supplied for processing. For example, the feedstock may be a tire shred ranging in size from about 0.5 inches to about 10 inches. The material is fed into the material processing apparatus 10 or 60 of the present invention, and passes through material processing roller assemblies, being counter-rotating corrugated rolls. Material is passed through the roll nip, which may be formed as a gap between the two roll assemblies, in a range from about 0.001 inches to about 0.015 inches. As the material passes between roller assemblies, the individual corrugations found on each of the rolls along with the roll nip tend to tear and grind the material to reduce its size. Roller assemblies are driven to have a high friction ratio that also warms the tire shreds as it is processed. With a rubber material, the method results in the formation of crumb rubber of a desired size, formed after one or more passes through the machine. Additional crumb rubber is produced as the rubber begins to heat around a temperature of about 150° F.

In the embodiment of FIGS. 6 and 7, after the material passes through the top roller assemblies, the material drops directly into the counter-rotating roller assemblies of the machine below. This second pair of roller assemblies further reduces the shredded crumb rubber to smaller sizes that include a range from about 2000 microns to about 180 microns. A conveyor below the material processing system may then be used to remove the material for use or further processing, such as for screening and/or magnetic separation of any steel particles found in the material.

The foregoing description of embodiments of the present invention has been provided for the purposes of illustration and description. It is not intended to be exhaustive or to limit the invention to the precise forms disclosed. Obviously, many modification and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A material processing apparatus comprising:
a first frame including a pair of laterally opposed sides and a base; and
at least a first pair of substantially cylindrical material processing rolling assemblies having a substantially smooth outer cylindrical surface, with the rolling assembles mounted in the laterally opposed sides relative to one another to form a compression zone between the smooth outer surfaces of the rolling assemblies, wherein each of the rolling assemblies are driven by a drive motor assembly being hydraulic drive motors powered by a closed-loop hydrostatic power unit, such that using the drive motors, the respective rolling assemblies can each be driven at a predetermined speed to provide a predetermined friction ratio between the smooth outer surfaces of the rolling assemblies, wherein the predetermined friction ratio is provided by rotating the smooth outer surfaces of the rolling assemblies at a differential speed of at least fifteen to one relative to one another such that material passing through the compression zone between the rolling assemblies is subjected to compression and shearing forces from the substantially smooth outer surfaces of the rolling assemblies due to the friction ratio.

2. The material processing apparatus of claim 1, wherein the rolling assemblies are modular and comprise at least a main body portion and supporting end plates, such that the main body portion is selectively separable from the supporting end plates.

3. The material processing apparatus of claim 2, wherein the main body portion is selectively detachable from the end plates when the end plates are supported in bearing support assemblies in the opposed sides.

4. The material processing apparatus of claim 1, wherein at least one of the rolling assemblies has a plurality of corrugations extending along the length of the rolling assembly which are formed to extend inwardly from the smooth outer surface thereof.

5. The material processing apparatus of claim 4, wherein both rolling assemblies have corrugations and the corrugations are formed at an angle relative to a longitudinal axis of the rolling assemblies, and the corrugations of one rolling assembly are angled in an opposing angular direction to the corrugations of the other rolling assembly.

6. The material processing apparatus of claim 1, wherein the frame is modular and comprises separate sides and a base, wherein the sides are selectively attached to the base.

7. The material processing apparatus of claim 1, wherein a second frame is provided to support at least a second pair of substantially cylindrical material processing rolling assemblies wherein the second frame is stackable on the first frame, with the at least second pair of rolling assemblies mounted in conjunction with the pair of rolling assemblies such that material to be processed is passed consecutively through at least both the second pair and first pair of rolling assemblies.

8. The material processing apparatus of claim 7, wherein the second pair of rolling assemblies are mounted to a second pair of laterally opposed frame sides, wherein the first sides supporting the first pair of rolling assemblies are separate members mounted on a base and the sides supporting the second pair of rolling assemblies are separate and are stacked on top of said first pair of laterally opposed sides.

9. The material processing apparatus of claim 7, wherein the friction ratio of the pair of rolling assemblies and the second pair of rolling assemblies are distinct.

10. The material processing apparatus of claim 1, wherein the closed-loop hydrostatic power unit allow each of the rolling assemblies to be driven at a variable speed, while handling high shock loads and increasing the torque value for each rolling assembly.

11. The material processing apparatus of claim 1, wherein the apparatus processes elastomeric materials.

12. A material processing apparatus comprising:
a first frame supporting a first pair of substantially cylindrical material processing rolling assemblies having smooth outer surfaces positioned adjacent each other to form a compression zone between the smooth outer surfaces through which elastomeric material to be processed is selectively passed, and a plurality of corrugations formed in the surfaces of the rolling assemblies along the length of the rolling assemblies,
drive motors associated with each of the rolling assemblies wherein the drive motors are hydraulic drive motors powered by a closed-loop hydrostatic power unit to rotationally drive each of the rolling assemblies at a different speed, with the speed differential between the rolling assemblies of at least 15:1 to provide a predetermined friction ratio at the compression zone between the smooth outer surfaces, the friction ratio providing warming of the material as it is passed through the compression zone.

13. The material processing apparatus of claim 12, wherein the friction ratio provides warming of the material to a temperature of at least about 150 degrees F.

14. The material processing apparatus of claim 12, wherein the rolling assemblies are modular and comprise a main body portion and separable supporting end plates.

15. The material processing apparatus of claim 12, wherein the speed differential between the rolling assemblies is more than 25:1.

16. The material processing apparatus of claim 12, wherein the main body portion is selectively detachable from the end plates when supported in bearing support assemblies associated with the laterally opposed side members.

17. A material processing apparatus comprising:

a first frame including a pair of laterally opposed separate side members and a base member to which the side members are selectively attached, the side members supporting a first pair of substantially cylindrical material processing rolling assemblies having smooth outer surfaces positioned adjacent each other to form a compression zone between the smooth outer surfaces through which material to be processed is selectively passed, and a plurality of corrugations formed surfaces of the rolling assemblies along the length of the rolling assemblies, wherein the rolling assemblies are modular and comprise a main body portion and separable supporting end plates wherein the main body portion is selectively detachable from the end plates when the end plates are supported in bearing supports associated with the laterally opposed side members, and hydraulic drive motors powered by a closed-loop hydrostatic power unit associated with each of the rolling assemblies to rotationally drive each of the rolling assemblies at a different speed, with the speed differential between the rolling assemblies of more than 15:1 to provide a predetermined friction ratio at the compression zone between the smooth outer surfaces.

18. The material processing apparatus of claim 17, wherein the speed differential between the rolling assemblies is more than 25:1.

* * * * *

UNITED STATES PATENT AND TRADEMARK OFFICE
CERTIFICATE OF CORRECTION

| | | |
|---|---|---|
| PATENT NO. | : 7,588,206 B2 | Page 1 of 1 |
| APPLICATION NO. | : 11/011559 | |
| DATED | : September 15, 2009 | |
| INVENTOR(S) | : Hausman et al. | |

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 43 days.

Delete the phrase "by 43 days" and insert -- by 125 days --

Signed and Sealed this

Twentieth Day of April, 2010

David J. Kappos
*Director of the United States Patent and Trademark Office*